Sept. 3, 1929.                I. H. DERBY ET AL                    1,727,052
                    METHOD OF PURIFICATION OF HYDROCARBON
                             Filed Feb. 13, 1922
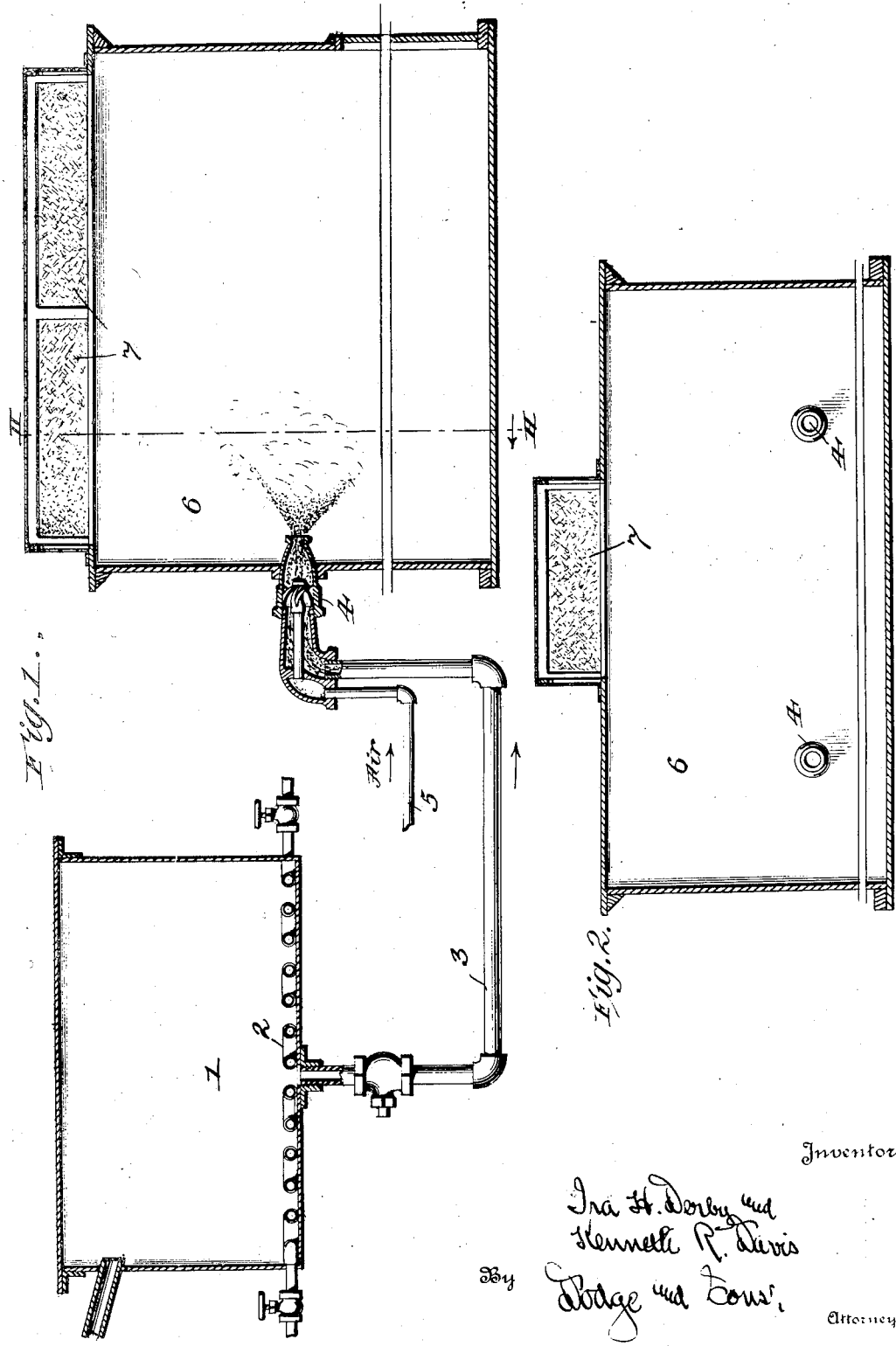

Patented Sept. 3, 1929.

1,727,052

UNITED STATES PATENT OFFICE.

IRA H. DERBY AND KENNETH R. DAVIS, OF INDIANAPOLIS, INDIANA; SAID DERBY ASSIGNOR TO PETER C. REILLY, OF INDIANAPOLIS, INDIANA.

METHOD OF PURIFICATION OF HYDROCARBONS.

Application filed February 13, 1922. Serial No. 536,191.

This invention pertains to the purification of hydrocarbons such as are solid at ordinary atmospheric temperatures.

It has to do more particularly with the purification of hydrocarbons of the aromatic series or their derivatives, and also hydrocarbon derivatives of the aliphatic or open chain series.

Naphthalene and other hydrocarbons have heretofore been purified by various methods, the final steps of which methods have been either sublimation, distillation or other physical operations. We have found, however, that the purification of naphthalene, or other hydrocarbons of the types above specified, can be accomplished better, quicker and cheaper by atomizing the same while in a liquid condition. It is preferable to carry out the process at the lowest temperatures possible.

Any suitable form of apparatus may be employed.

In the annexed drawing there is disclosed an apparatus which we have successfully employed, wherein,—

Fig. 1 is a sectional elevation of a melting pan or heating receptacle and an enclosure or room into which the atomized material is blown; and Fig. 2 is a transverse vertical sectional view on the line II—II of Fig. 1.

In said drawings, which are more or less diagrammatic, 1 denotes a tank or receptacle into which the material to be treated is passed preferably directly from the still in which it is produced. To maintain it at a proper temperature, or to first melt it, in case it becomes solidified within the tank, a heating coil 2 is placed therein. A valved pipe 3 leads from the tank and terminates in a nozzle 4, preferably of the spray or whirling type, a pipe 5 also being connected into the nozzle and connected to a source of compressed air or other inert gas. The nozzle head terminates within a chamber or housing 6 adjacent the upper portion thereof, two of such nozzles being shown in the instant case, though, of course, any number may be employed dependent upon the supply of the material to be treated and the size of the impounding chamber. Preferably the chamber will be normally closed when the process is under way, except for vents, such as 7, which are covered by suitable material as cheese cloth which, while arresting the flake-like material, admits of the escape of air and any entrained substance removed thereby from the material undergoing treatment.

In operating, say on naphthalene, it is brought to a temperature of say from 100° to 120° C. and the cold air or gas blast, at approximately 60 lbs. pressure, turned on through pipe 5. The molten naphthalene is then allowed to flow through pipe 3 and entering nozzle 4, into which it is drawn by the air, is thoroughly intermixed with and broken up by the air leaving the nozzle in the form of a mist. The chamber 6 shortly becomes filled with the fine flake-like particles which float around therein and finally settle down to the floor. It will be found that such particles are crystalline in form; it will also be found that the material has been freed of moisture and such oils as are entrained and carried over as the material leaves the still. The product produced is very pure commercial naphthalene and in a form which may be readily utilized.

It is found that atomization is an improvement over distillation, chilling and crushing not only from the points of time and labor saving but also in that the product is much purer. The yield from a given amount of naphthalene charged into a still is greater in that it is not necessary to take off as large a head as under the old processes. Atomization is an improvement over sublimation in that it is so much quicker and cheaper and gives a better product for working up in succeeding steps in manufacturing derivatives. Naphthalene from the still, at 78.5° C. melting point, upon atomization gives a product melting at about 79.5° C.

Any form of device for securing atomization may be employed, but the employment of a nozzle having the central air jet with a whirler is preferred, as it is found that a thorough intermingling of the compressed air or inert gas and a complete breaking up of the material in liquid-phase is effected and this without the formation of any droplets of the material which, of course, is undesirable.

As above indicated, various substances may be treated, as, for instance, anthracene, at a temperature of 225° to 250° C., and phenanthrene, 120° to 140° C. Carbazol, which is a solid derivative of a hydrocarbon, melting at 245 to 265° C., (depending upon its purity) may be treated in a similar manner, with good results. Generally stated the preferred temperature employed is about 20° to 50° C. above the melting point of the substance to be atomized.

The term "normally solid hydrocarbon compound" is intended to cover the hydrocarbons and their derivatives as herein described.

What is claimed is:—

1. That method of purifying normally solid hydrocarbon compounds which consists in atomizing such a material while in a molten condition, by subjecting the same to a blast of inert gas.

2. That method of purifying normally solid hydrocarbon compounds which consists in heating such a material to a degree approximately 20° C. above its melting point and atomizing the same by the employment of a blast of inert gas.

3. That method of purifying normally solid hydrocarbon compounds which consists in heating such a material to a degree approximately 20° C. above its melting point, and atomizing and blowing the same into a chamber closed against the egress of the flake-like particles produced by such atomization.

4. That method of purifying naphthalene, which consists in heating the same to such a degree as to render it fluid; and thereafter atomizing the same while at an atmospheric pressure at which the said naphthalene can exist as a solid.

5. That method of purifying naphthalene, which consists in bringing the same into a liquid phase and subjecting the material while in such condition to an atomizing air blast at a relatively lower temperature at which said naphthalene can exist as a solid.

6. That method of purifying naphthalene which consists in raising the temperature thereof to a point at least 20° C. above its melting point and thereafter atomizing the same into a chamber by an air blast of a relatively lower temperature.

In testimony whereof we have signed our names to this specification.

IRA H. DERBY.
KENNETH R. DAVIS.